United States Patent [19]

Vinciguerra et al.

[11] Patent Number: 5,407,284
[45] Date of Patent: Apr. 18, 1995

[54] ROLLER BEARING OF VERY SMALL AXIAL EXTENSION AND WITH SLIDING ELASTIC SEALS, PARTICULARLY SUITABLE FOR THE CONNECTION JOINTS BETWEEN THE DOBBY AND THE HEDDLE FRAMES IN A LOOM

[75] Inventors: Constantino Vinciguerra; Alessandro Galanti, both of Florence, Italy

[73] Assignee: Nuovopignone - Industrie Meccaniche e Fonderia S.p.A., Florence, Italy

[21] Appl. No.: 163,119

[22] Filed: Dec. 6, 1993

[30] Foreign Application Priority Data

Dec. 18, 1992 [IT]  Italy ............................... MI92A02883

[51] Int. Cl.[6] ...................... F16C 43/04; F16C 33/78; F16C 33/58
[52] U.S. Cl. .................................... 384/561; 384/485; 384/564
[58] Field of Search ............... 384/485, 561, 564, 569, 384/570

[56] References Cited

U.S. PATENT DOCUMENTS

| | | | |
|---|---|---|---|
| 2,360,078 | 10/1944 | Smith et al. | 384/561 |
| 3,869,182 | 3/1975 | Glifberg | 384/485 |
| 4,722,616 | 2/1988 | Lederman | 384/515 X |
| 4,915,511 | 4/1990 | Kotegawa et al. | 384/564 X |
| 5,228,788 | 7/1993 | Vinciguerra | 384/561 |

*Primary Examiner*—Thomas R. Hannon

[57] ABSTRACT

A roller bearing of very small axial extension and with sliding annular elastic seals is provided for forming a connection joint. Opposing shoulder rings project orthogonally beyond the guide and rolling track of the bearing outer race, which race is of rectangular cross-section. The rings are held in position by the two cheeks of the female part of the joint that is to be formed. Annular elastic seals, moreover, cooperate under axial action with the sides of the bearing outer race. Preferred embodiments of the seals and of the shoulder rings are also provided.

3 Claims, 3 Drawing Sheets

ROLLER BEARING OF VERY SMALL AXIAL EXTENSION AND WITH SLIDING ELASTIC SEALS, PARTICULARLY SUITABLE FOR THE CONNECTION JOINTS BETWEEN THE DOBBY AND THE HEDDLE FRAMES IN A LOOM

BACKGROUND OF THE INVENTION

1. Field of the Invention

This invention relates to a new roller bearing which has a very small axial extension, of the order of 8 mm, a high loading capacity, of the order of 1000 kg, and hermetic annular elastic sliding seals, and which, by the use of a particular structure and axially acting seals, achieves a considerable reduction in production and control costs and an increase in its loading capacity, or alternatively a reduction in axial extension for the same loading capacity.

2. Description of the Prior Art

More specifically the invention relates to an improvement in the roller bearing with hermetic elastic seals described in Italian patent application No. 19109A/90 filed by the present applicant on Jan. 19, 1990.

Said known roller bearing, which is of a type particularly suitable for use in the joints of heddle frame operating levers in looms, in which the presence of a high degree of dust and trash makes it convenient to use pre-greased rollers with a hermetic sliding elastic seal preventing the lubricant grease escaping, consists substantially of an outer race which forms the outer rolling track for the rollers and has a C cross-section, the two lateral appendices of which act as shoulders for said rollers and terminate in two cylindrical surfaces which cooperate, by sliding contact, with two radially acting annular elastic seals rigid respectively with two opposing lateral shoulder rings for said rollers, housed in two corresponding opposing annular grooves formed in the sides of the bearing inner race comprising the inner rolling track for said rollers.

Because of the currently high level of competition in the loom industry, it is of primary importance to solve the problem of reducing in every possible manner the production cost of such bearings without detracting from their functionality. From this viewpoint it has been found that the aforesaid bearing involves very high grinding and testing costs because of the C shape of its outer race, which requires delicate and difficult operations within the C.

SUMMARY OF THE INVENTION

The object of the present invention is to obviate said drawbacks by providing a roller bearing of considerably reduced construction costs while maintaining an equally effective hermetic seal, and with increased loading capacity.

This object is substantially attained by using a bearing outer race of rectangular rather than C cross-section, with an evident reduction in and facilitation of the grinding and testing operations because of the lesser number of surfaces to be treated, and two opposing lateral shoulder rings which are housed in two corresponding opposing annular grooves provided in the sides of the bearing inner race and project beyond the rolling track of said outer race, for which they form a lateral shoulder to each terminate with an annular elastic appendix preferably of frusto-conical shape which cooperates to provide axially acting sliding hermetic sealing with one or other of the two sides of said bearing outer race, said shoulder rings being maintained in position by the two cheeks of the female part of the joint to be formed.

With such a construction, in addition to achieving a reduction in production costs for the aforesaid reasons, an increase in loading capacity is also achieved as it now becomes possible to form the shoulder rings and relative elastic seals of reduced axial thickness, to hence for equal bearing thicknesses use rollers of greater axial extension, as the hermetic seal is achieved against the sides of the outer race and no longer against shoulder appendices which have necessarily to be of a certain minimum width to ensure permanent sealing action of the elastic element, this evidently limiting the usable width for the rollers. Hence, the roller bearing of very small axial extension and high loading capacity for a connection joint consisting of a male part internally supporting said bearing and inserted between two cheeks of a female part, said bearing comprising an inner annular race and an outer annular race both provided with facing cylindrical guide and rolling tracks for said rollers, and two annular sliding elastic seals rigid respectively with the outer surface of, for said rollers, two opposing lateral shoulder rings housed in two corresponding opposing annular grooves formed in the sides of said bearing inner race, is characterised according to the present invention in that said two opposing lateral shoulder rings project orthogonally beyond said guide and rolling track of said outer race, which is of rectangular cross-section, said annular sliding elastic seals cooperating, under axial action, with the sides of said bearing outer race, said shoulder rings being maintained in position by said two cheeks of the female part of the joint to be formed.

According to a preferred embodiment of the present invention said two annular sliding elastic seals each consist of an elastic covering, preferably of rubber, on the free outer surfaces of the lateral shoulder ring, said covering comprising, at the free outer end of said ring, an elastic annular projecting lip of frusto-conical form with its diameter increasing and its thickness decreasing in the direction of the rollers, and projecting beyond that surface of said shoulder ring, adjacent to the rollers. In this manner, the elastic inflection of said projecting lip against the side of the bearing outer race, which occurs when the bearing is mounted, creates an axial action determining effective and perfect sliding hermetic sealing against said side even if small radial or axial movements occur between the outer and inner tracks caused by the loads applied to the joint.

Finally, according to a further preferred embodiment of the present invention, the two said opposing lateral shoulder rings for the rollers have an inner diameter slightly less than the minimum diameter of the corresponding annular groove provided in the sides of he bearing inner race.

This slight interference under which the ring is mounted in its annular groove maintains the ring in position, so considerably facilitating the mounting of the bearing.

The invention is further clarified hereinafter with reference to the accompanying drawings, which illustrate a preferred embodiment given by way of non-limiting example in that technical or constructional modifications can be made thereto without leaving the scope of the present invention.

DESCRIPTION OF THE PREFERRED EMBODIMENTS

Figure 1:
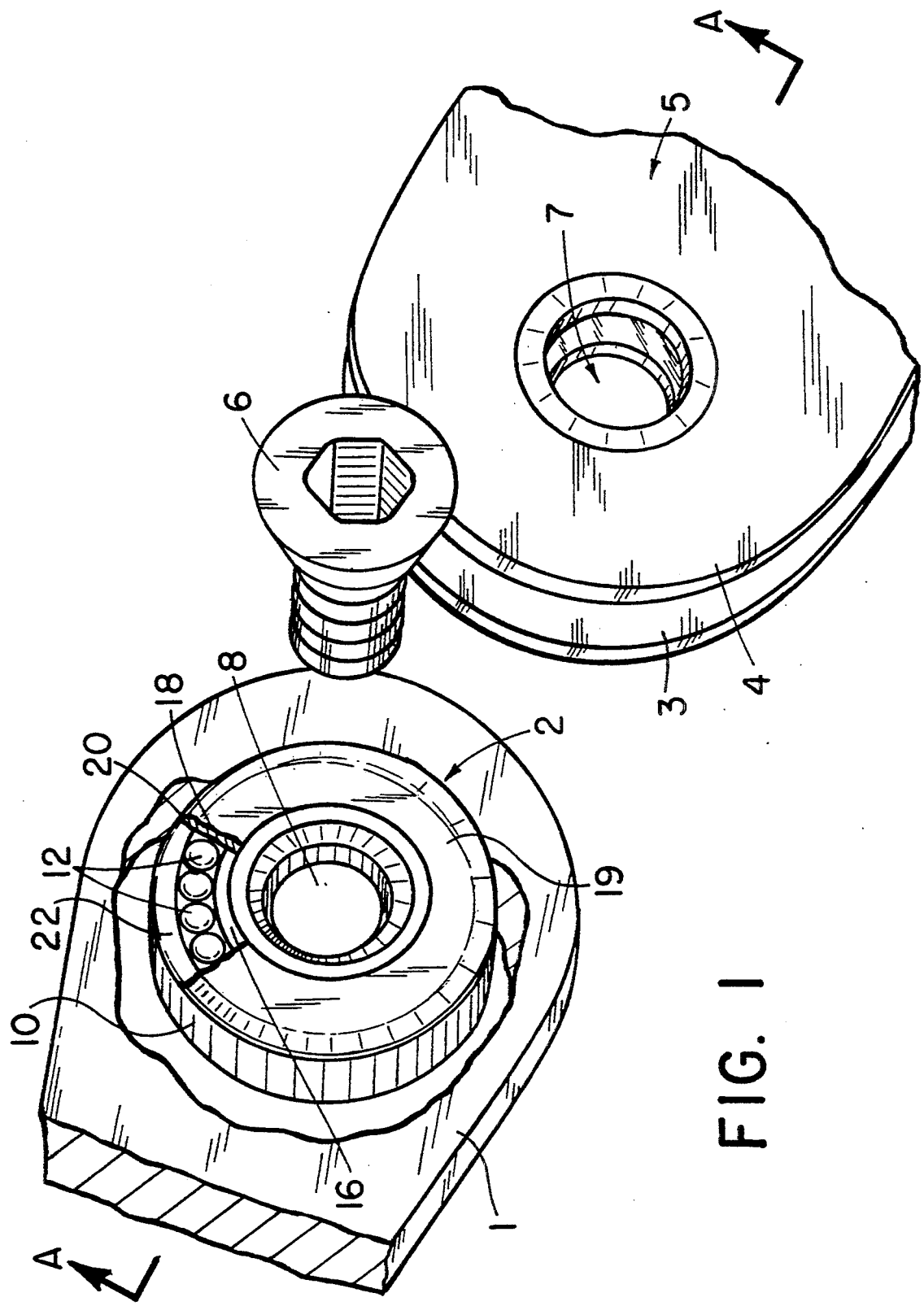
FIG. 1 is a partly sectional exploded perspective view of a connection joint using a bearing in accordance with the invention.
Figure 2:
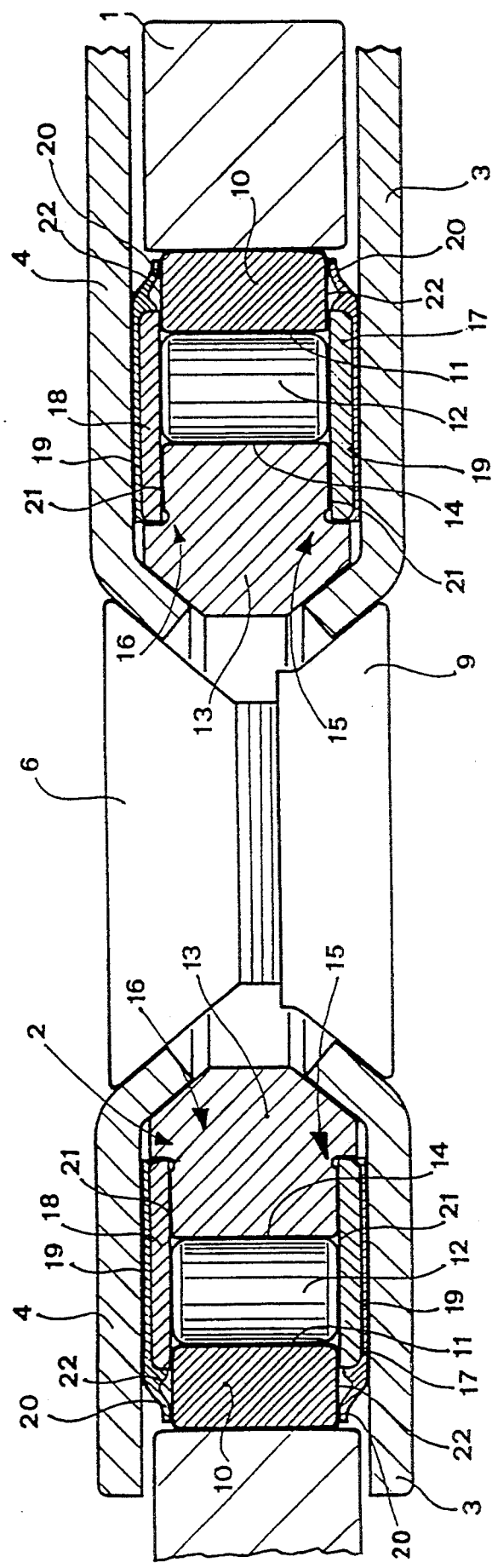
FIG. 2 is a side sectional view to an enlarged scale, taken on the line AA of FIG. 1.

In the figures the reference numeral 1 indicates the male part of a connection joint which in its interior supports the bearing 2 and is inserted between the two cheeks 3 and 4 of the female part 5 of said joint and maintained in position by a bolt 6 which passes through the hole 7 in said female part 5 and the hole 8 of the bearing 2 to cooperate with a nut 9.

Said bearing 2 comprises an outer annular race 10 of rectangular cross-section provided with a cylindrical guiding and rolling track 11 for the rollers 12, and an inner annular race 13 also provided with a cylindrical guiding and rolling track 14 for said rollers 12, this track facing the track 11. At the outer ends of its opposing sides, said inner annular race 13 comprises two opposing annular grooves 15 and 16 housing two opposing lateral shoulder rings 17 and 18 for said rollers 12, said rings projecting orthogonally beyond said guide and rolling track 11 of the outer annular race 10. Said opposing lateral shoulder rings 17 and 18 have an inner diameter slightly less than the minimum diameter of the corresponding annular groove 15 and 16 so that to overcome the interference said rings have to be forced into the groove, this evidently facilitating the mounting of the bearing by virtue of the fact that the rings cannot move and therefore cannot fall out.

Figure 3:
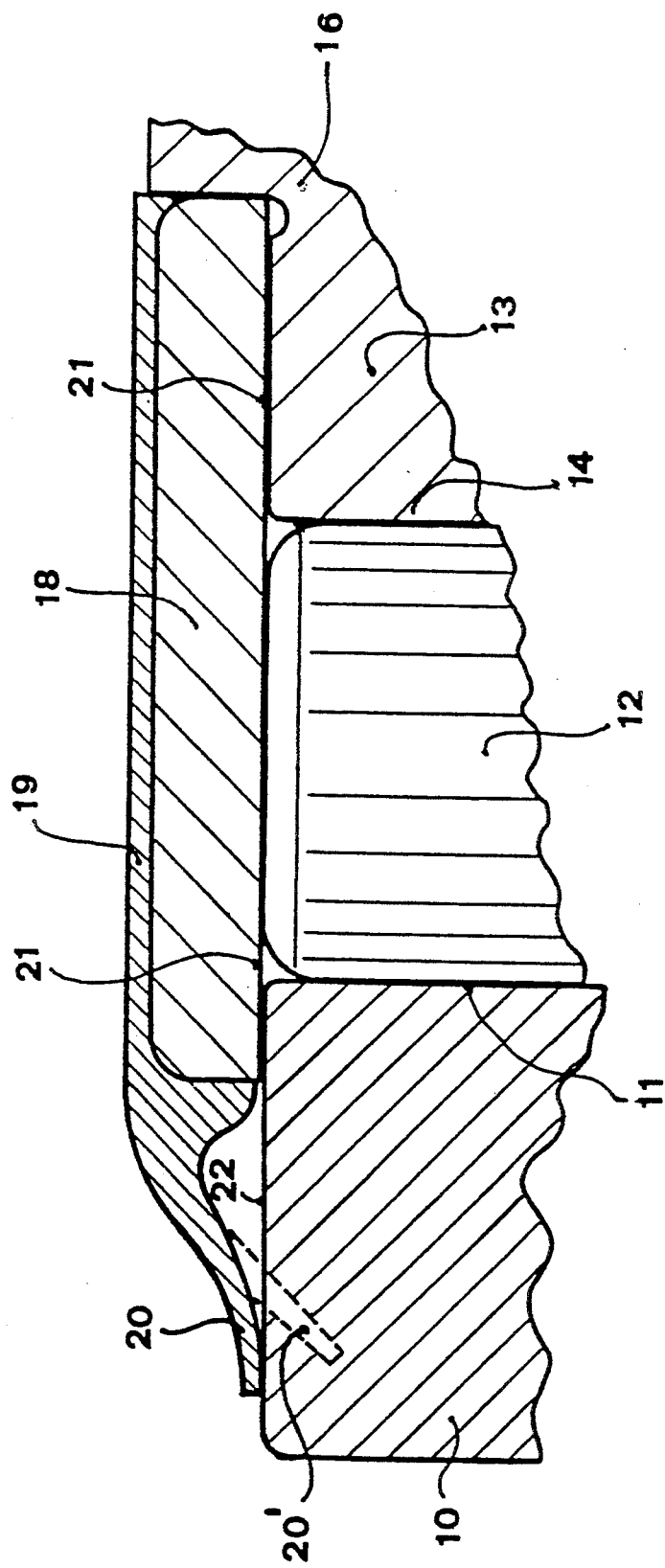
FIG. 3 is a considerably enlarged detailed partial sectional view showing one of the sliding elastic seals of FIG. 2.

Said lateral shoulder rings 17 and 18, held in position by said two cheeks 3 and 4 of the female part 5 of the joint, are covered on their outer surface by a covering 19 of elastic material, such as rubber, which at the free outer end of said rings terminates in a sliding elastic seal consisting of a projecting annular elastic lip 20 of frusto-conical shape with its diameter increasing and its thickness decreasing in the direction of the rollers 12 (see specifically FIG. 3). When in its undeformed configuration said lip 20 projects beyond that surface 21 of the shoulder ring 18 adjacent to the rollers 12, as shown by dashed lines and indicated by 20' in FIG. 3.

In this manner the consequent axial deformation of the lip from 20' to 20 results in an axial thrust which ensures a perfect seal by the lip 20 against the side 22 of said outer annular race 10 of the bearing 2.

We claim:

1. A roller bearing having a plurality of rollers, the bearing being of very small axial extension and high loading capacity for a connection joint comprising a male part internally supporting the bearing and inserted between two cheeks of a female part, the bearing having an inner annular race and an outer annular race both provided with facing cylindrical guide and rolling tracks for the rollers, and two annular sliding elastic seals rigid respectively with the outer surface of two opposing lateral shoulder rings housed in two corresponding opposing annular grooves formed in the sides of said bearing inner race, said two opposing lateral shoulder rings protruding orthogonally beyond said guide and rolling track of said outer race, which is of rectangular cross-section, said annular sliding elastic seals cooperating, under axial action, with the sides of said bearing outer race, said shoulder rings being maintained in position by said two cheeks of the female part of the joint to be formed.

2. A roller bearing as claimed in claim 1, in which said two annular sliding elastic seals each has an elastic covering on the free outer surfaces of each of said respective lateral shoulder rings, said covering comprising, at the free outer end of said respective ring, an elastic annular protruding lip of frusto-conical form, wherein said lip diameter increases and its thickness decreases in the direction of the rollers, said lip protruding beyond said respective shoulder ring adjacent to the rollers.

3. A roller bearing as claimed in claim 1, wherein said two opposing lateral shoulder rings for the rollers further comprise an inner diameter less than the minimum diameter of said corresponding annular groove in said bearing inner race grooves.

* * * * *